United States Patent [19]

Winnek

[11] Patent Number: 4,945,407
[45] Date of Patent: Jul. 31, 1990

[54] HIGH DEFINITION, THREE-DIMENSIONAL TELEVISION

[76] Inventor: Douglas F. Winnek, 28091 Robinson/Canyon Rd., Carmel, Calif. 93923

[21] Appl. No.: 351,241

[22] Filed: May 12, 1989

[51] Int. Cl.⁵ .............................................. H04N 13/00
[52] U.S. Cl. .......................................... 358/88; 358/89
[58] Field of Search ................................... 358/88–92; 350/132

[56] References Cited

U.S. PATENT DOCUMENTS

| | | | |
|---|---|---|---|
| 3,852,524 | 12/1974 | Ando et al. | 358/91 |
| 4,172,632 | 10/1979 | Holmes, Jr. | 358/132 |
| 4,367,486 | 1/1983 | Eichenlaub | 358/88 |
| 4,562,463 | 12/1985 | Lipton | 358/88 |
| 4,692,792 | 9/1987 | Street | 358/88 |

Primary Examiner—Stephen Brinich
Attorney, Agent, or Firm—Townsend and Townsend

[57] ABSTRACT

A camera having a main lens system designed for normal operation at infinity and well corrected for a flat field. A stationary aperture member having a horizontal slit therein passes light through the main lens system toward and through a lenticular screen which lies ahead of and in close proximity to the sensor plane of a charge controlled device (CCD) chip. The lenticular screen lies flat side toward the imaging plane of the CCD chip and produces a parallax panoramagram of the unidirectional type where only horizontal parallax information is preserved. A portrait lens can be used in front of the main lens system to allow the main lens system to operate at its designed infinity setting. A field lens can be used between the main lens system and the lenticular screen to normalize the light rays from the main lens before they reach the lenticular screen.

23 Claims, 4 Drawing Sheets

FIG.1
FIG.2
FIG.3
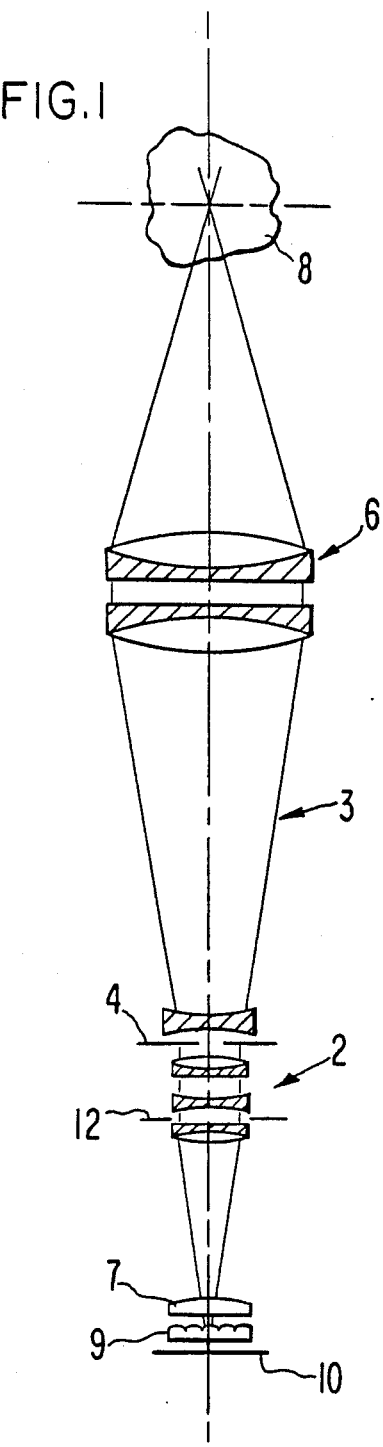
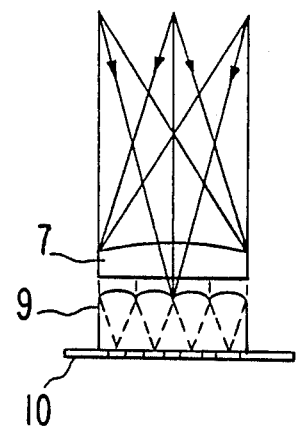
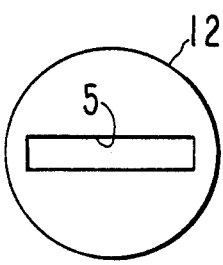

HIGH DEFINITION, THREE-DIMENSIONAL TELEVISION

FIELD OF THE INVENTION

This invention relates to improvements in apparatus for forming three-dimensional pictures and, more particularly, to a camera lens for taking three-dimensional television pictures.

SUMMARY OF THE INVENTION

The present invention is directed to a television camera having a main lens system designed for normal operation at infinity and well corrected for a flat field. A stationary aperture member having a horizontal slit therein passes light through the main lens system toward and through a lenticular screen which lies ahead of and in close proximity to the sensor plane of a charge controlled device ("CCD") chip. The lenticular screen lies flat side toward the imaging plane of the CCD chip and produces a parallax panoramagram of the unidirectional type where only horizontal parallax information is preserved.

A portrait lens can be used in front of the main lens system to allow the main lens system to operate at its designed infinity setting. A field lens can be used between the main lens system and the lenticular screen to normalize the light rays from the main lens before they reach the lenticular screen.

The primary object of the present invention is to provide an improved camera for use in generating high definition three-dimensional television picture wherein the camera is simple and rugged in construction, has no moving parts, and can be operated with minimum skills to result in the taking of quality three-dimensional television pictures.

Other objects of this invention will become apparent as the following specification progresses, reference being had to the accompanying drawings for an illustration of the invention.

BRIEF DESCRIPTION OF THE DRAWINGS

FIG. 1 is a schematic view of the camera of the present invention, for use in making high definition three-dimensional television pictures;

FIG. 2 is an enlarged, fragmentary schematic view of a part of the camera showing the transparent lenticular screen and a field lens in front of the image plane of the camera;

FIG. 3 is a front elevational view of an aperture member which is another part of the camera of the present invention;

DETAILED DESCRIPTION OF THE DRAWINGS

Figure 4:
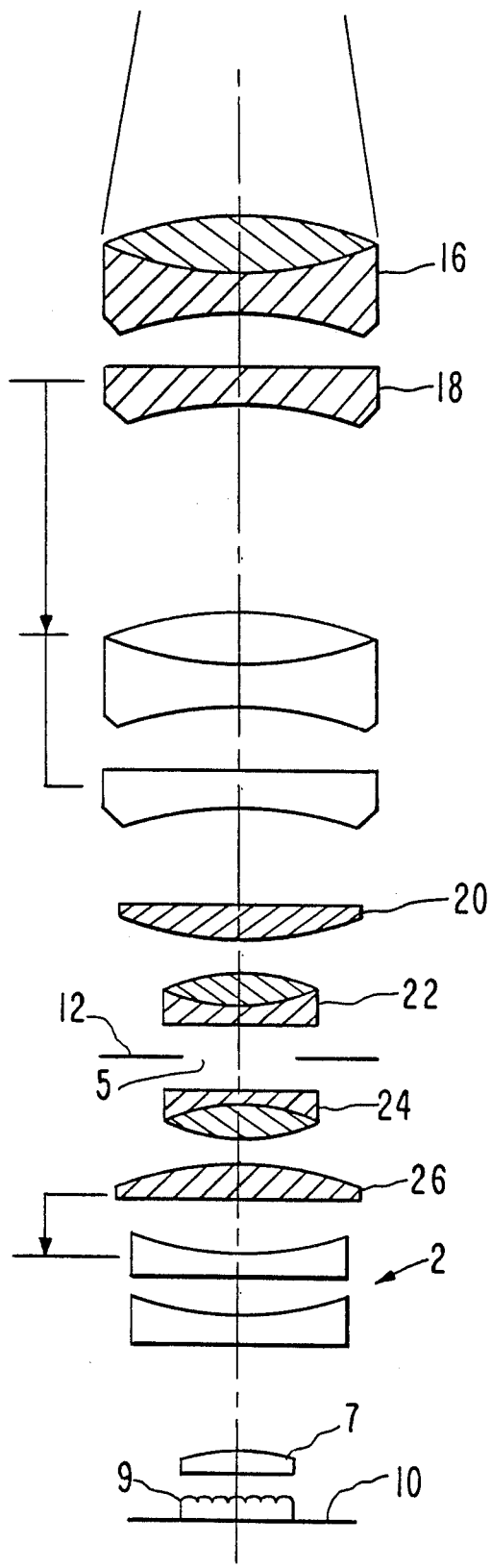
FIG. 4 is an enlarged, schematic view of a zoom lens system used with the camera lens system of FIG. 1.

The camera (FIG. 1) of the present invention is broadly denoted by the numeral 1 and includes a main camera 1 and an aperture member 12 shown in more detail in FIG. 4. The camera 1 has been designed for normal operation of lens system 2 at infinity, and the lens system 2 is well corrected for a flat field. The lens typically is a 55 mm. focal length/f2.8 Ektar lens preceded by a 36" focal length telephoto converter 3.

The aperture member 12 is between the two principal planes of the camera lens system 2 as shown in FIG. 1, and slit 5 of member 12 (FIG. 3) is generally rectangular in shape. A typical dimension for slit 5 is 1" in length and ⅛" in height.

A portrait lens 6 can be used in advance of telephoto lens 3 and camera lens system 2 to enable camera 1 to work at its design infinity setting. Lens 6 is preferably a six-inch diameter achromat (typical focal length, 40") and may be provided to accommodate any desired focal length. The portrait lens 6 is used to determine the principal subject plane of focus (typically at 40") from the front principal plane of the portrait lens 6. The subject 8 to be photographed is shown forwardly of portrait lens 6.

A field lens 7 is rearwardly of camera lens system 2 and is an achromat or plano-convex cylindrical lens placed in front of a transparent lenticular screen 9 to normalize the converging bundles of light rays so that the lenticular fields of lenticular screen 9 are filled with incoming light rays more uniformly. Lenticular screen 9 typically has a number of vertical lenticules which serve as cylindrical lenses to divide the total field into incremental fields in the horizontal direction. However, the lenticules can be inclined if desired for special applications. The field lens 7 and lenticular screen 9 are shown in more detail in FIG. 2.

The camera lens system 2 forms the image and becomes the object lens for lenticular screen 9. The lenticular screen 9 may be of any pitch (typically in a range of 500–1000 cylindrical lenses per linear inch). In a preferred embodiment, lenticular screen 9 has 1000 lenses per inch. The field of view of a single lens should be matched by the total angle of convergence of light rays projected by the slit 5 on the horizontal axis.

A photographic or light sensitive CCD chip 10 is placed at the rear flat face of lenticular screen 9. Chip 10 is exposed when a shutter 4 is opened and light emanating from subject 8 passes through the camera and through the lenticular screen 9 to the image plane of the CCD chip of the camera. FIGS. 1 and 2 show the way in which the light rays pass from subject 8 into and through lenticular screen 9.

As shown in FIG. 1, the part of the camera which lies ahead of field lens 7 constitutes a normal but high quality camera lens system 2 except for aperture member 12 which reduces the energy in the vertical direction by a factor such as a factor of about 24. This factor has been determined empirically, but it is clear that 24 is the right order of magnitude to balance the effect of the presence of the lenticular screen 9. The result of the use of the front lens elements of camera lens system 2 up to the field lens 7 is a bundle of rays diverging slightly in the horizontal cross-section and diverging sharply in the vertical direction. The light rays coming to a focus at the CCD sensor plane come from all parts of the illuminated aperture 5 of member 12 and converge to focus so as to form a sharp image of all objects at or near the datum plane, i.e., the front focal plane in the subject 8.

FIG. 2 shows the effect of field lens 7. Light ray traces have been made through two surfaces of field lens 7 at several strategic points. From FIG. 2, it is clear that the primary effect of field lens 7 is to bend the rays so that the central ray in each bundle which converges to form a sharp point is essentially perpendicular to the CCD sensor plane. Lens 7 also changes the magnification in the horizontal axis so that it is non-linear from the center of the picture out to the edges. However, this effect is sufficiently small such that it does not disturb the appearance of the reproduction.

In use, CCD chip 10 is placed directly against the back surface of the lenticular screen 9 and, therefore, refraction of the back plane of screen 9 does not have a significant effect on the images striking the CCD chip 10. Thus, the analysis reduces to calculations of the image forming properties of the cylindrical lenses or lenticules of lenticular screen 9. Camera lens system 2 and field lens 7 are adjusted to give a sharp image of the datum plane on the CCD sensor plane. Objects in front of and behind the datum plane will then focus sharp images, respectively, behind and in front of the ground glass screen. This is in accordance with the basic system formula as follows:

$$(1/P)+(1/Q)=(1/F_{(eff)})$$

where the overall system of lenses has been replaced for simplicity with a single lens of effective focal length $F_{eff}$, and P and Q are, respectively, the object distance measured from the front surface of the effective lens and the image distance measured from the second principal plane of the effective lens. Simple measurements of the relative displacement of the image with a given displacement of the object using a 40" portrait lens 6 and a field lens 7 showed an approximate relationship of:

$$Q=(1/3.6)\times P$$

Thus, objects displaced from the datum plane by 3.6" will image at ±1" from the image plane of the CCD chip.

Camera lens system 2 has a typical focal length of 55 mm. The angle subtended by aperture 5 attained by any line element on the negative is, then, very minute (only minutes of arc). Because of this small angle and because of the effects of the lenticular screen 9, the horizontal focus appears to be very uncritical and the defocusing effect of the field lens 7 can be compensated during the adjustment for best focus.

When a photograph has been taken through lenticular screen 9 and displayed through a similar lenticular screen, the image will appear in reverse relief, i.e., pseudoscopic. This pseudoscopic image, therefore, must be converted to a stereoscopic image by and during an electronic scan of the CCD chip.

The CCD chip 10 is a charge-coupled device designed as a full frame imager for imaging scenes at low levels in the spectral region from 450 mm to the ear infrared. At a high resolution mode, a CCD imager will provide standard RS 170 video signals providing images of 60K to 3 Meg picture elements, at frame speeds of 60 Hz and above.

FIG. 4 illustrates a zoom lens system 14 which provides a variable focus system for continually increasing or decreasing the equivalent focal length of a telephoto lens by sliding the lens elements 16, 18, 20, 22, 24 and 26 to smoothly vary their separation. The desired effect is that of moving the camera closer to or away from the scene without actually transporting it. The variable focus system of a high-quality zoom lens provides satisfactory correction of lens aberrations, continual focusing on the face of the CCD chip, and maintains a constant f/—value. The image distance as measured from the back lens element 26 to the face of the CCD chip 10 remains constant.

The front element 16 of the zoom lens may be a cap-on. It is designed with a wide aperture (anywhere from 2.5" to 12" in diameter). This wide aperture element provides for a path of the continuum of aspect views of the scene.

The back lens element 26 of the zoom lens projects converging rays upon the face of the lenticular screen which divides the continuum into numerous discrete picture elements behind the lenticular ridges.

Field lens 7 is placed directly ahead of the lenticular screen 9 to generalize the rays to achieve picture elements of uniform width behind the lenticules. The composite picture image on the face of the CCD chip 10 is a parallax panoramagram; it has all of the elements of the three-dimensional scene. When viewed through a lenticular screen it renders a full three-dimensional image. This image would appear pseudoscopic (in reverse relief) except for the transposition to a stereoscopic image by and during an electronic scan of the CCD chip, thus producing a fully stereoscopic picture. The zoom lens system 14, with the addition of the large diameter front lens element 16, provides a high quality parallax panoramagram which may then be imaged on the face of the CCD chip for transmission.

Figure 5:
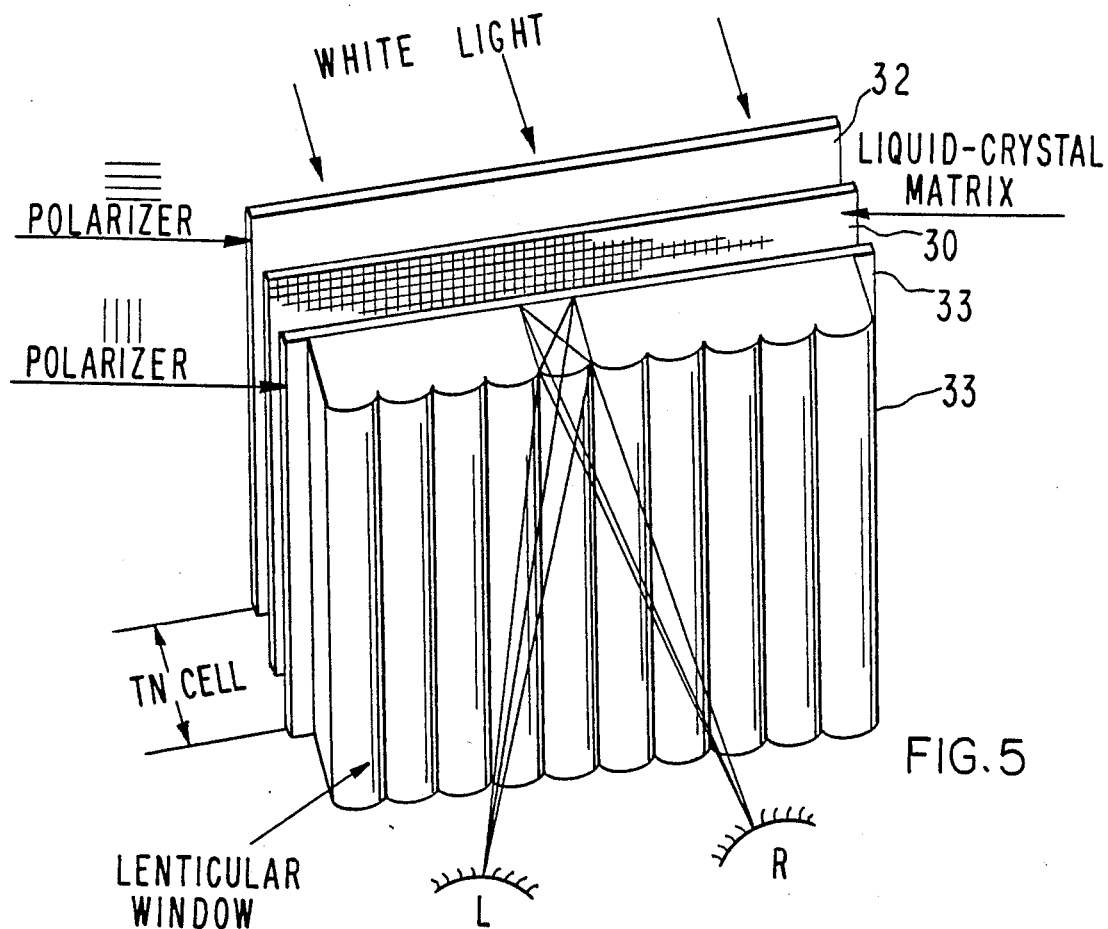
FIG. 5 is a schematic view of an active matrix liquid crystal, flat panel display.
Figure 5A:
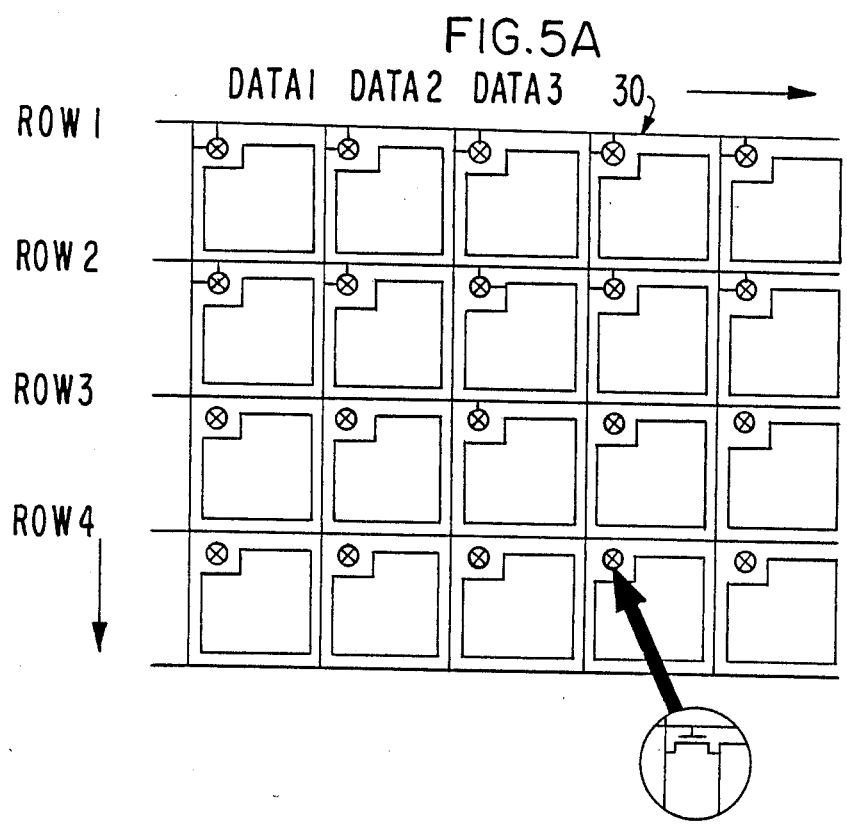
FIG. 5A is a schematic view of a basic thin film transistor active matrix.

FIG. 5 shows an active matrix liquid crystal flat panel display 30, with added lenticular viewing screen 31 through which the observer sees the three-dimensional television picture (no glasses required). Active matrix flat panel displays ("LCDs") are now available for military, commercial and scientific services. Better known as LCD's, these flat panel displays render high-definition pictures in color or monochrome.

A conventional liquid crystal active matrix panel ("LCD") is a flat panel comprised of two thin polarized glass plates 32 and 33 with a twisted pneumatic liquid crystal cell in positive mode. When no voltage is applied to the two electrodes, light is transmitted by the sandwich structure, i.e., the light polarized by the first polarizer 32 "follows" the twist of the TN molecule and passes through the second polarizer 33. When voltage is applied to the two electrodes, the dielectric anisotropy of the TN molecules causes it to "unwind" and align itself parallel to the electric field. Under the circumstances the polarization of the light transmitted by the cell does not rotate 90 degrees and thus the light transmitted by the first polarizer 32 is stopped by the second polarizer 33. A color mosaic filter can be used with the display 30 to provide color characteristics to the images viewed through screen 31.

In active matrices, when a pixel is selected, a given voltage is applied to that pixel alone, and not to any nonselected pixel. For our purposes, in order to achieve electronic conversion of the parallax panoramagram from pseudo to stereo, and to achieve high quality performance on a large area flat panel color three-dimensional television display or computer graphics display, the operation would be as follows:

1. Select voltages are applied to each 10th pixel of the first row of thin film transistor ("TFT") gates, then ninth, eighth, seventh, etc., in the first row of TFT gates, while a nonselect voltage is applied to all other rows of TFT gates.

2. Simultaneously, data voltages are applied to all the column electrodes in order to charge each pixel in the selected row to the desired voltage.
3. The select voltage applied to the first row of TFT gates is changed to a nonselect voltage.
4. Steps 1-3 are repeated for each succeeding row until all of the rows have been selected and the pixels charged to their desired voltages.
5. All columns are selected in one scanning period.

Figure 6:
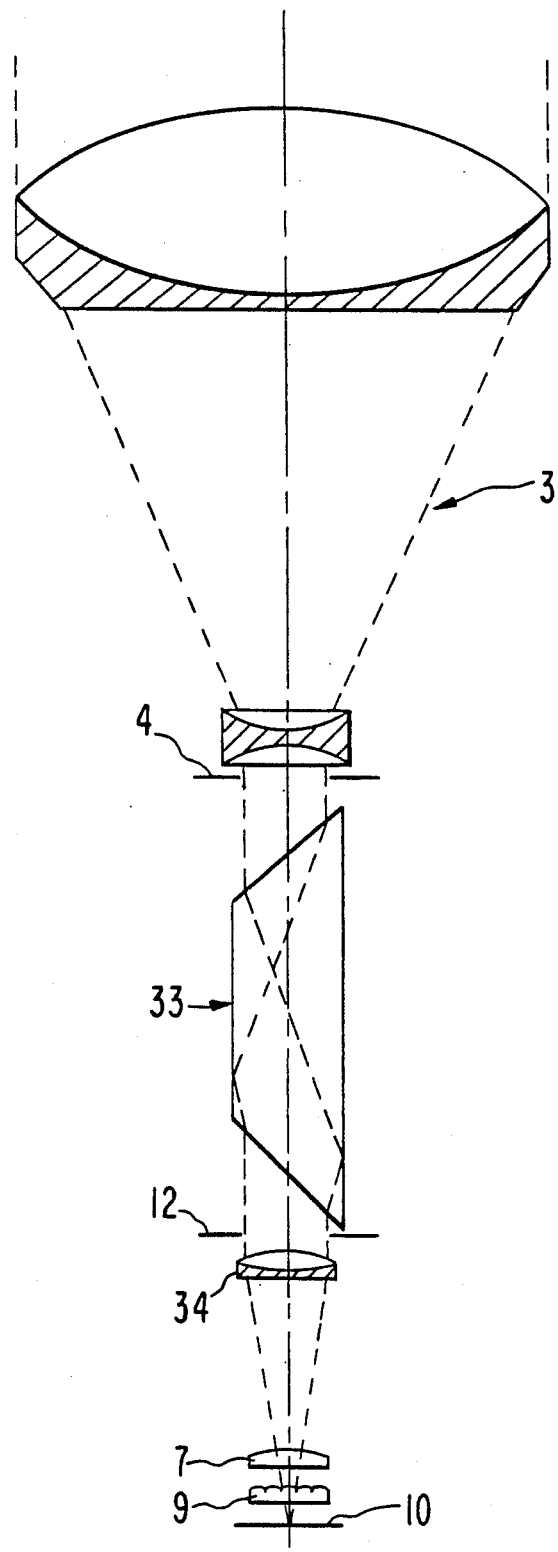
FIG. 6 is a schematic view of an alternate camera of the present invention for use in making three-dimensional television pictures.

FIG. 6 shows an alternate lens system, thus replacing the special electronic sequence mentioned above to change from pseudoscopic to stereoscopic conditions. An inverting dove prism 33 is placed between the telephoto converter lens 3 and the conventional camera lens or achromat 34. The camera lens is rearwardly of aperture member 12 and forwardly of field lens 7 and lenticular screen 9. Because of the presence of a dove presence 33, the system produces a direct stereoscopic image upon the image plane of the CCD chip 10 which is rearwardly of lenticular screen 9 and field lens 7 as shown in FIG. 6.

I claim:

1. Apparatus for use in making three-dimensional pictures comprising:
    a lens system adapted to receive light rays from an object to be viewed in three dimensions;
    a charge coupled device optically aligned with the lens system to receive light rays therefrom; and
    a lenticular screen adjacent to the device for forming three-dimensional images from the light rays passing toward the device, whereby the images will be received by the device and thereafter can be processed to form three-dimensional pictures.

2. Apparatus as set forth in claim 1, wherein said lens system includes a telephoto lens unit.

3. Apparatus as set forth in claim 1, wherein said lens system includes a portrait lens.

4. Apparatus as set forth in claim 1, wherein said lens system includes a zoom lens unit.

5. Apparatus as set forth in claim 1, wherein is included a field lens forwardly of and in proximity to the lenticular screen.

6. Apparatus as set forth in claim 1, wherein the lens system has an aperture member provided with a slit therethrough, said slit being optically aligned with the device.

7. Apparatus as set forth in claim 6, wherein the slit has a length and width, the length being longer than the width.

8. Apparatus as set forth in claim 1, wherein the lenticular screen has a plurality of cylindrical lenses, said lenses being generally vertical.

9. Apparatus as set forth in claim 8, wherein the lenticular screen has a front face and rear face, the cylindrical lenses being on the front face of the lenticular screen.

10. Apparatus as set forth in claim 9, wherein the rear face of the lenticular screen is flat and in proximity to the device.

11. Apparatus as set forth in claim 8, wherein the lenticular screen has cylindrical lenses in the range of 500-1000 lenses per linear inch.

12. Apparatus as set forth in claim 1, wherein is included a dove prism optically aligned with the lens system to cause a direct stereoscopic image on the charged coupled device.

13. Apparatus as set forth in claim 12, wherein said lens system includes a telephoto lens, there being a field lens forwardly of said screen, said dove prism being between the telephoto lens and the field lens.

14. A camera for making high definition, three-dimensional television pictures comprising:
    a camera lens system;
    a charge coupled device spaced from the camera lens system on one side thereof and optically aligned therewith, said charge coupled device being sensitive to light;
    a lens in front of the camera lens system for directing light from an object spaced outwardly from the lens, whereby light rays in the optics will pass through the lens and the camera lens towards the charge coupled device; and
    a transparent lenticular screen adjacent to the charge coupled device to present a three-dimensional image of the object on the charge coupled device.

15. Apparatus as set forth in claim 14, wherein is included an aperture member having a slit and coupled with the camera lens system.

16. Apparatus as set forth in claim 14, wherein the lens unit is a telephoto lens.

17. Apparatus as set forth in claim 14, wherein is included a portrait lens on the outer end of the telephoto lens.

18. Apparatus as set forth in claim 14, wherein the lenticular screen has a front face provided with lenticulations thereon and a rear flat face, said rear flat face being adjacent to and contiguous with the adjacent face of the charge coupled device.

19. Apparatus as set forth in claim 14, wherein said lens system includes a zoom lens unit.

20. Apparatus as set forth in claim 14, wherein is included a dove prism optically aligned with the lens system to cause a direct stereoscopic image on the charged coupled device.

21. Apparatus as set forth in claim 14, wherein said lens system includes a telephoto lens, there being a field lens forwardly of said screen, said dove prism being between the telephoto lens and the field lens.

22. Optical viewing apparatus comprising:
    a liquid crystal display adapted to be actuated with signals representative of an optical image viewable in three dimensions; and
    a lenticular viewing screen optically aligned with the liquid crystal display for viewing the image on the latter in three dimensions when the liquid crystal display is actuated.

23. Apparatus as set forth in claim 22, wherein is included a color mosaic filter between the liquid crystal display and the lenticular screen.

* * * * *